C. L. STRICKLER.
EYEGLASS OR GOGGLE SUPPORT.
APPLICATION FILED APR. 1, 1920.

1,361,640.

Patented Dec. 7, 1920.

Inventor
Charles L. Strickler
By Geo. P. Kimmel
Attorney

UNITED STATES PATENT OFFICE.

CHARLES L. STRICKLER, OF WASHINGTON, DISTRICT OF COLUMBIA.

EYEGLASS OR GOGGLE SUPPORT.

1,361,640.  Specification of Letters Patent.  Patented Dec. 7, 1920.

Application filed April 1, 1920. Serial No. 370,568.

*To all whom it may concern:*

Be it known that I, CHARLES L. STRICKLER, a citizen of the United States, residing at Washington, in the District of Columbia, have invented certain new and useful Improvements in Eyeglass or Goggle Supports, of which the following is a specification.

This invention relates to improvements in eyeglasses or goggle supports, and the principal object thereof is to provide means for suspending eyeglasses or goggles from the vizor of a cap or the brim of a hat so that the same will not become disengaged or displaced through jars and vibration.

Further objects of the invention are; to provide an attachment for suspending eyeglasses or goggles so that the usual pressure and friction upon the bridge of the nose of the wearer will be relieved; and to so construct the attachment that it may be moved out of the line of vision of the user when not in actual use.

For the purpose of illustrating this invention, there are shown in the accompanying drawings two forms thereof which are at present preferred, since the same have been found in practice to give satisfactory and reliable results, although it is to be understood that the various instrumentalities of which the invention consists can be variously arranged and organized and that the invention is not limited to the precise arrangement and organization of these instrumentalities as herein shown and described.

In the drawings.

Like characters of reference indicate like or similar parts throughout the several views, in which.

A designates for the sake of illustration a cap, which is provided with the usual vizor B from which is suspended by means of the attachment which forms the subject matter of the present invention a pair of eyeglasses C.

Figure 1:
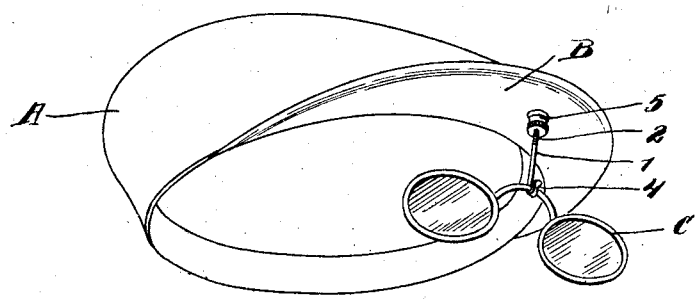
Figure 1 is a perspective view of the device as applied to the vizor of a cap and shows to advantage the method of supporting eyeglasses or goggles thereupon.
Figure 2:
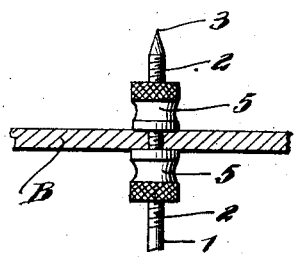
Fig. 2 is a detail view through the attaching means for the attachment to the vizor of a cap or brim of a hat.
Figure 3:
Fig. 3 is a detail of the hook for engagement with the bridge piece of eyeglasses.

The preferred embodiment of the invention is formed with an elongated shank portion 1 which is screw threaded as at 2 throughout a portion of its length and is provided with a needle or piercing end 3 and a hooked end 4. Attention is called to the fact that the hooked end 4 is formed by flattening the material of the shank and bending the same upwardly and outwardly as clearly illustrated in Fig. 3. Mounted upon the screw threaded portion of the shank 2 are a pair of thumb nuts 5 which are provided with the usual knurled portions to prevent slipping of the fingers thereupon. When the device is applied to the vizor of a cap or the brim of a hat the piercing end 3 of the shank is inserted, therethrough, one of the thumb nuts 5 being removed, and when the hat brim or vizor becomes engaged with the other thumb nut 5 the thumb nut which has been removed is screwed down thereupon to securely clamp the shank in position. Attention is called to the fact that the distance which the shank of the attachment extends from the vizor may be regulated by moving the thumb nuts up and down on the shank.

Figure 4:
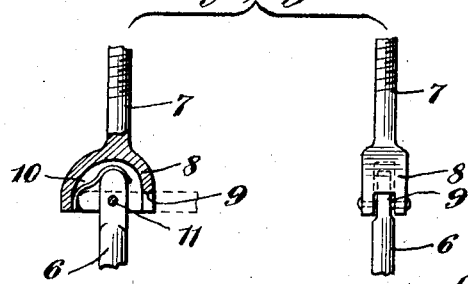
Fig. 4 is a detail view of a modification of the invention showing means provided for moving the same out of the line of vision of a user when the device is not in actual use.

As clearly illustrated in Fig. 4, the modified form of the present invention consists in forming the shank in sections 6 and 7, the section 7 being provided with an inverted cup shaped end or head 8 having a lateral slot 9. Within the cup shaped portion 8 is attached a plate spring 10 which frictionally engages the terminal portion of the section 6, which is pivoted as at 11. Consequently when the section 6 is moved to the position shown in dotted lines in Fig. 4 a portion thereof engages the end face of the slot 9 and the rear end of the section is frictionally engaged by the spring 10 consequently holding the section 6 at right angles to the section 7 and out of the line of vision of the user. When it is desired to utilize the section 6 to suspend a pair of eyeglasses it is merely moved down to lie in the position shown in solid lines in Fig. 4.

In operation the eyeglasses are suspended in the hooked portion 4 of the device and are consequently prevented from becoming disarranged or disengaged through jars and vibration such as would be encountered in riding in an automobile or other vehicle. It is pointed out that the engagement of the bridge portion of the eyeglasses with the bridge of the nose of a user is not necessitated and consequently the usual discomfort experienced by users of eyeglasses will be eliminated.

From the foregoing it is thought that the operation of the eyeglass support will be understood, but as many changes could be made in the above construction and many apparently widely different embodiments of this invention could be made without departing from the scope thereof, it is intended that all matters contained in the above description or shown in the accompanying drawings shall be interpreted as illustrative and not in a limiting sense. It is also to be understood that the language used in the following claims is intended to cover all of the generic and specific features of the invention herein described and all statements of the scope of the invention, which, as a matter of language might be said to fall therebetween.

What I claim is:

1. A support for eyeglasses comprising a screw threaded shank for insertion through the vizor of a cap or brim of a hat, a piercing end on the shank for penetrating the material of the vizor or brim, a hook on the other end of the shank for receiving and supporting eyeglasses and means for holding the shank in position.

2. A support for eyeglasses comprising a screw threaded shank for insertion through the vizor of a cap or brim of a hat, a piercing end on the shank for penetrating the material of the vizor or brim, a hook formed on the remaining end of the shank for receiving and supporting eyeglasses, and a pair of coactive thumb nuts on the shank for adjustably holding the same in place.

In testimony whereof, I affix my signature hereto.

CHARLES L. STRICKLER.